A. A. NORTH.
DRILL CHUCK.
APPLICATION FILED MAY 10, 1912.

1,053,530.

Patented Feb. 18, 1913.

WITNESSES
Louis Lucia
M. E. O'Neill

INVENTOR
Albert A. North:
BY
N. E. Hart
his ATTORNEY

UNITED STATES PATENT OFFICE.

ALBERT A. NORTH, OF NEW BRITAIN, CONNECTICUT, ASSIGNOR TO THE SKINNER CHUCK COMPANY, OF NEW BRITAIN, CONNECTICUT, A CORPORATION OF CONNECTICUT.

DRILL-CHUCK.

1,053,530. Specification of Letters Patent. Patented Feb. 18, 1913.

Application filed May 10, 1912. Serial No. 696,395.

*To all whom it may concern:*

Be it known that I, ALBERT A. NORTH, a citizen of the United States, and a resident of New Britain, in the county of Hartford and State of Connecticut, have invented certain new and useful Improvements in Drill-Chucks, of which the following is a specification.

The object of this invention is to produce a drill chuck provided with a gear tightener of novel and advantageous construction.

Figure 1:
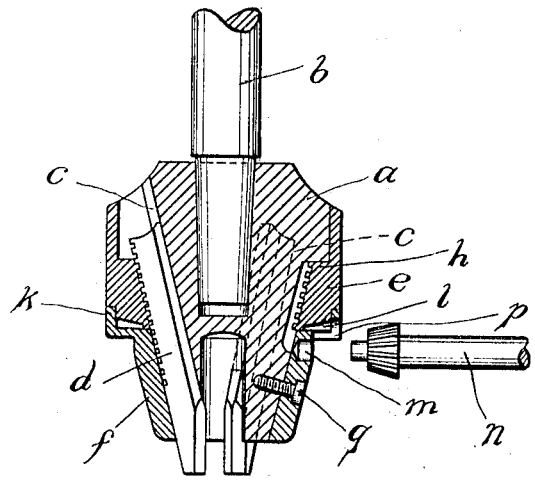
Figure 2:
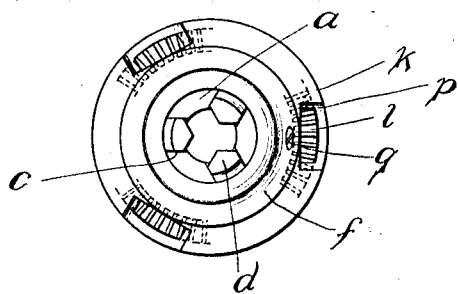

In the drawings Figure 1 is a central vertical section of a chuck embodying my invention. Fig. 2 is an end view of the same.

Referring to the drawings $a$ denotes the body apertured at its rear to receive the spindle $b$ and having longitudinal grooves $c$ in its side walls in which the jaws $d$ slide. $e$ is a nut rotatable on the body and having threaded engagement with the jaws in order that upon rotation of the nut the jaws will be moved longitudinally. The rear side of the nut bears against a shoulder $h$ on the body of the chuck, and a cap $f$ fitting on the shoulder end of the body engages the nut and holds it in place on the body, so that it is free to rotate but cannot move longitudinally. As illustrated the cap is held in position by the screw $g$. In the forward end of the nut a rack $l$ is cut, and this rack is inclosed by a sleeve having an annular flange $k$. As illustrated, this sleeve is formed as an integral part of the cap. There are chuck constructions where the body has a circumferential groove into which a two-part nut is located and held together by a collar which forms the means for manually operating the nut. In such a type of chuck there is no necessity for a cap, and in such a case, the inclosing sleeve might conveniently be formed as a separate part and slid onto the body of the chuck into position, and then fastened to the body. In the side of the cap adjacent to the flange is a socket $m$ to receive the stud end of a pinion wrench $n$, and the flange is cut away just above the socket as indicated at $p$ in order to expose the rack to permit the pinion to mesh therewith.

It is apparent that the nut can be operated by hand to cause the jaws to grip a tool shank, but in a great many cases a further tightening of the jaws is required, and it has been customary to accomplish this by gear-and-pinion mechanism.

The particular advantage in the hereinabove described construction lies in the fact that I am able to provide a gear tightening device in a chuck of small and compact construction and to inclose the rack so as to avoid any possibility of the workman catching his finger in the gear teeth.

For convenience, the invention has been illustrated as embodied in a "Skinner" type of chuck, but it is apparent that it is adapted for use with other types of chuck.

I claim as my invention:

1. In a device of the character described, a body having jaw grooves, jaws longitudinally movable therein, a nut rotatable on the body, having threaded engagement with the jaws and normally held against longitudinal movement; a rack cut in the forward end of the nut; a sleeve fixed on the chuck body inclosing said rack and having notches cut therein at intervals to expose the rack teeth; the chuck having a socket adjacent to the notches in the flange for the purpose specified.

2. In a device of the character described, a body having jaw grooves, jaws movable longitudinally in the grooves, a nut rotatable on the body and having threaded engagement with the jaws, a cap fixedly secured to the body, a flange on the cap inclosing the end of the nut; a rack cut in the inclosed end of the nut, said flange having notches formed at one or more points to expose the rack teeth, the cap having a socket adjacent to the notches.

3. In a device of the character described, a body having jaw grooves, jaws longitudinally slidable in said grooves, a nut rotatably mounted on the body and having threaded engagement with the jaws, a cap fixedly mounted on the body, an L-shaped flange on said cap inclosing the end of said nut, gear teeth on the inclosed end of said nut, said flange being notched at one or more separated points to expose said teeth, said cap having a socket adjacent to a notch in the flange, and means on said chuck body adapted to be engaged by mechanism to operate the teeth upon said nut.

ALBERT A. NORTH.

Witnesses:
L. D. CARTER,
E. J. SKINNER.

Copies of this patent may be obtained for five cents each, by addressing the "Commissioner of Patents, Washington, D. C."